United States Patent
Diep

(12)
(10) Patent No.: US 6,205,955 B1
(45) Date of Patent: Mar. 27, 2001

(54) APPARATUS FOR CLEANING AND DULLING CAT'S CLAWS

(76) Inventor: Michael Y. Diep, 1075 Bellevue Way NE., Bellevue, WA (US) 98004

( * ) Notice: Subject to any disclaimer, the term of this patent is extended or adjusted under 35 U.S.C. 154(b) by 0 days.

(21) Appl. No.: 09/383,621

(22) Filed: Aug. 26, 1999

Related U.S. Application Data

(63) Continuation-in-part of application No. 09/106,553, filed on Jun. 29, 1998, now abandoned.

(51) Int. Cl.[7] .......................... A01K 13/00; A01K 15/02; A45D 29/04; A45D 29/06
(52) U.S. Cl. .......................... 119/706; 119/165; 119/174; 132/76.5
(58) Field of Search .................................. 119/165, 161, 119/169, 174, 620, 621, 706, 52.2, 52.3, 57.8, 57.9, 28.5, 51.03; 132/76.4, 76.5

(56) References Cited

U.S. PATENT DOCUMENTS

| | | | |
|---|---|---|---|
| 2,504,282 | * | 4/1950 | Tobias ............................ 119/51.03 |
| 3,273,537 | * | 9/1966 | Orr ................................. 119/51.03 |
| 5,042,430 | * | 8/1991 | Casmira ............................ 119/165 |
| 5,176,155 | * | 1/1993 | Rudolph, Jr. ..................... 132/76.4 |
| 5,218,930 | * | 6/1993 | Casmira ............................ 119/165 |
| 5,275,181 | * | 1/1994 | Rudolph, Jr. ..................... 132/76.4 |
| 5,377,617 | * | 1/1995 | Harwich ............................ 119/6.5 |
| 5,564,365 | * | 10/1996 | Kacic ............................... 119/165 |
| 5,579,720 | * | 12/1996 | Udelle et al. ..................... 119/621 |
| 5,816,195 | * | 10/1998 | Flynn ............................... 119/165 |
| 5,924,383 | * | 7/1999 | Smith ............................... 119/165 |
| 6,109,212 | * | 8/2000 | Schacherbauer ................... 119/165 |

* cited by examiner

*Primary Examiner*—Peter M. Poon
*Assistant Examiner*—James S. Bergin
(74) *Attorney, Agent, or Firm*—Robert W. Jenny

(57) ABSTRACT

The basic apparatus includes an abrasive layer and a grid. The grid is installed over the abrasive layer, a shorter distance from it along one of its edges and a greater distance from it at the opposite edge. The shorter distance is about ⅛ inch and the longer distance ⅜ of an inch. One quarter inch hardware cloth is an acceptable grid material. Preferably the apparatus is mounted on a generally vertical surface near a litter box, such as on the inside of a wall of a covered litter box. The abrasive surface may be replaceable and faces the grid and cats use the abrasive surface and grid simultaneously.

6 Claims, 1 Drawing Sheet

APPARATUS FOR CLEANING AND DULLING CAT'S CLAWS

This application is a Continuation-In-Part application based on application Ser. No. 09/106,553 filed Jun. 29, 1998, now abandoned.

BACKGROUND OF THE INVENTION

1. Field

The subject invention is in the field of apparatus and equipment used to improve living conditions for animals such as cats and for their keepers by facilitating the care of the animals. Specifically, it is in the fields of equipment and fixtures which (1) help an animal rid its feet of litter picked up in a litter box, to minimize the irritation of the animal by the litter and to minimize tracking of litter outside of the litter box, and (2) helping the animal meet its need to dull its claws and prevent overgrowth of its claws.

2. Prior Art

The patents listed below constitute patented prior art known to the inventor of the subject invention:

U.S. Pat. No. 2,997,019
U.S. Pat. No. 3,885,523
U.S. Pat. No. 5,042,430
U.S. Pat. No. 5,195,464
U.S. Pat. No. 5,565,365

These patents show (1) abrasive surfaces on which cats and other animals with claws can relieve the urge to dull their claws, and (2) grate-like surfaces on which cats walk when entering and leaving litter boxes. The intent is that when cats walk on these surfaces their feet will release litter entrapped in their claws.

It can be concluded from reviewing this patented prior art and non-patented equipment intended to serve the same purposes that for a keeper to provide a cat with the means to dull its claws and to rid its claws of litter after using a litter box, the keeper must provide two pieces of equipment. Also, while the "Litter Box With Abrasive Surfaces" of U.S. Pat. No. 5,565,365 takes advantage of a cats natural urge to scratch both horizontal and vertical surfaces, the devices for dislodging litter from claws do not and are therefore believed to not be optimally effective. Also, animals clawing on unprotected abrasive surfaces tend to irritate the flesh of the paws.

Accordingly, the primary objective of the subject invention is to provide apparatus which facilitates simultaneous conditioning of an animals claws and efficiently ridding the claws of litter while protecting the flesh of the paws from irritation. Other objectives are that the apparatus be suitable to animals in a range of sizes, be easily maintained and convenient to use for the animals and the keepers.

SUMMARY OF THE INVENTION

The subject invention is apparatus for cleaning and dulling the claws of animals, particularly cats. The apparatus comprises three parts. One is a sheet of material having an abrasive surface abrasive enough to effectively dull a cat's claws and the second part has approximately the same shape as the first part but is a screen or grid material. Such material, when made of wire, is termed hardware cloth and is made of wires uniformly spaced apart in both directions, forming square openings. For example, in ¼ inch hardware cloth the openings are about ¼ inch square. In ½ inch cloth the openings are about ½ inch square. The third part is a base and the apparatus is an assembly of the three parts with the abrasive surface facing the hardware cloth and with part of the edge of one part about ⅛ inch from the corresponding part of the edge of the other and other corresponding edges a greater distance apart, such as ¼ inch. In a preferred use the apparatus is installed on the inside of the wall of a covered litter box, with the closer together edges a few inches above the surface of the litter. The apparatus is sized and shaped (not necessarily rectangular) to cover a significant portion of a side of a litter box cover. It may also be supported on a frame used in conjunction with a non-covered litter box. Apparatuses may be mounted on both sides of a litter box and/or at an end.

It has been observed that after cats use an enclosed litter box, they consistently scratch at the walls of the cover, presumably in attempts to free their claws of litter particles and to dull their claws. The subject apparatus greatly facilitates this process. Smaller cats reach the thinner portion of the apparatus, near its lower edge. Larger cats reach the thicker upper portion. The apparatus is made so that the abrasive sheet can be easily replaced.

The invention is described in more detail below with reference to the attached drawings.

DETAILED DESCRIPTION OF THE INVENTION

The subject invention is apparatus for cleaning and dulling cats claws. In preferred usage it is installed on the inside of a wall of the cover 10 of a covered litter box 11 shown in FIG. 1. This kind of installation positions the apparatus a distance off the floor or ground and essentially vertical. It could be installed in such an orientation using a support framework and used with uncovered litter boxes. It can also be used on a generally flat, level surface next to or near a litter box.

Figure 1:
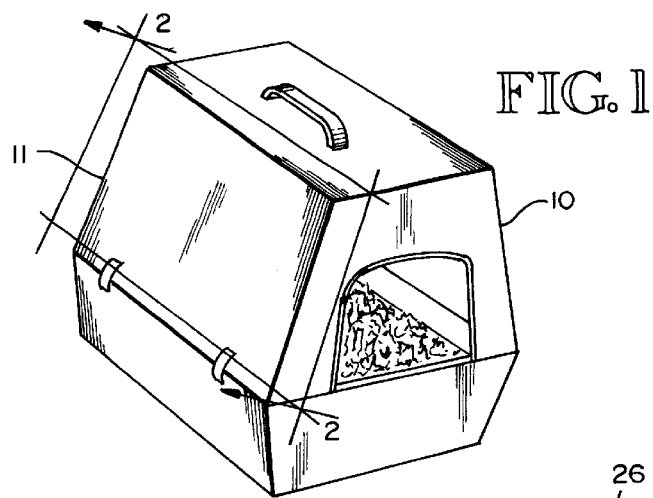
FIG. 1 is a general view of a covered litter box in which the subject inveniton can be optimally used.
Figure 2:
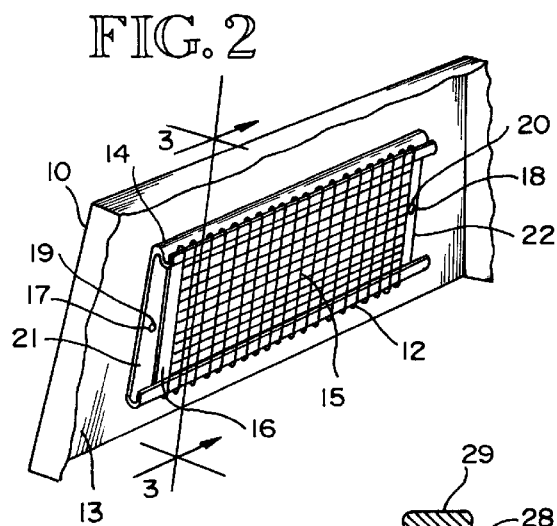
FIG. 2 is a sectional view taken at 2—2 in FIG. 1 showing the installation of the subject apparatus on a side of the litter box cover.

FIG. 2 is a sectional view taken at 2—2 in FIG. 1, illustrating the apparatus 12 attached to wall 13 of cover 10. The apparatus is an assembly of three parts: base 14, grid 15 and abrasive sheet 16. The base is attached to the wall by threaded fasteners 17 and 18 installed through holes 19 and 20 in portions 21 and 22. The apparatus is sized and shaped to cover a major portion of the wall.

Figure 3:
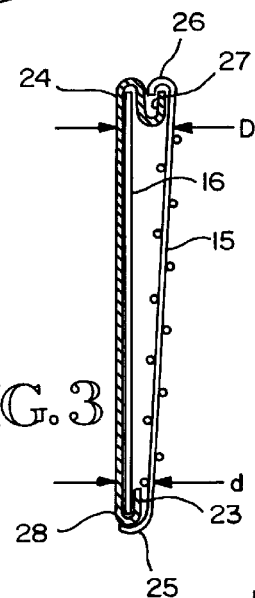
FIG. 3 is a section taken at 3—3 in FIG. 2.

FIG. 3 is a section taken at 3—3 in FIG. 2. The base is formed sheet metal or a metal or plastic extrusion. Sheet 16 is abrasive enough to effectively dull cat's claws and is mounted by sliding it into grooves 23 and 24. The grid is mounted by edges 25 and 26 of grid 15, which are curved to fit around ribs 27 and 28. The abrasive sheet is flexible and can be installed and removed by sliding it endwise in the grooves. The grid in this embodiment is closer to the sheet at lower edge 25 than at upper edge 26. Distance d near the lower edge is in a range of 0.06 to 0.2 inches with 0.15 inches preferred. Distance D near the upper edge is in a range of 0.2 to 0.4 inches with 0.3 inches preferred. In alternate embodiments the abrasive surface may be at a uniform distance from the grid or the distance may vary in any range, such as ³⁄₁₆ to ⅜ of an inch, between ⅛ inch and ½ inch.

The grid in this embodiment is made of ¼ inch hardware cloth. The grid can also be a molded plastic part with perforations in any pattern found to be useful in helping cats rid their claws of litter particles.

Figure 4:
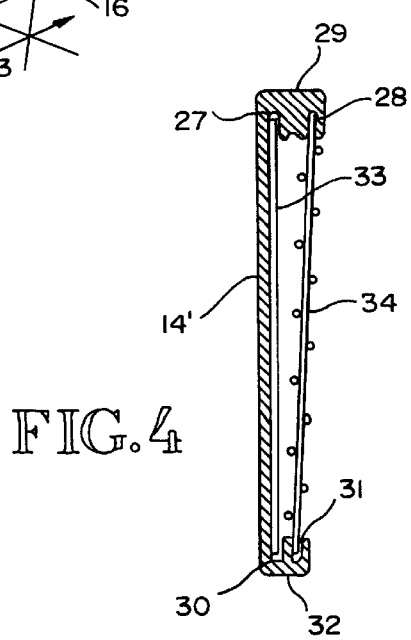
FIG. 4 illustrates an alternate embodiment.

FIG. 4 illustrates an alternate embodiment of the subject invention. Base 14' has grooves 27 and 28 at top edge 29 and grooves 30 and 31 at lower edge 32. Abrasive layer 33 slides into grooves 27 and 30 and grid 34 slides into grooves 28 and 31.

Figure 5:
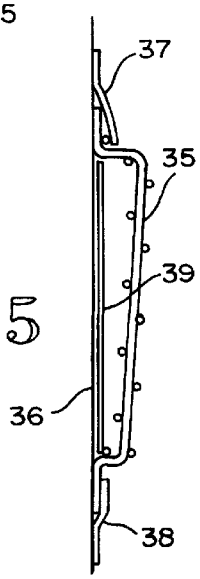
FIG. 5 illustrates an embodiment without a base.

In other embodiments no base is used and the abrasive layer and grid overlaying it are fastened directly to a surface using adhesives or adhesive tapes. In the embodiment shown in section in FIG. 5, grid 35 is fastened to surface 36 by adhesive tapes 37 and 38 and abrasive layer 39 is slid into place between the grid and surface.

It has been found that cats will instinctively claw a grid (or anything similar such as a piece of rug) to rid their paws of litter. With the subject apparatus, clawing for that purpose also serves to help the cat condition its claws in terms of sharpness and length.

It is considered to be understandable from this description that the subject invention meets its objectives. It provides apparatus which facilitates simultaneous conditioning of an animal's claws and efficiently ridding the claws of litter. The apparatus suits animals in a range of sizes, is easily maintained, is convenient to use for both animals and their keepers and does not irritate the flesh of the paws.

It is also considered to be understood that while certain embodiments of the invention are described herein, other embodiments and modifications of those described are possible within the scope of the invention which is limited only by the attached claims. For example, the grid can be made of wood or netting.

I claim:

1. Apparatus for cleaning and dulling cat's claws, said apparatus comprising:

a sheet having an abrasive surface, abrasive enough to effectively dull said claws, a grid and means for mounting said sheet and said grid with said surface facing said grid with said grid a distance from said abrasive surface, said distance being in a range of ⅛ to ½ inch.

2. The apparatus of claim 1 in which said apparatus is mounted generally vertical.

3. The apparatus of claim 2 in which said sheet is replaceable.

4. The apparatus of claim 1 in which said apparatus is mounted generally vertical and having an upper edge and a lower edge, said abrasive layer being closest to said grid near said lower edge.

5. The apparatus of claim 4 in which said sheet is replaceable.

6. The apparatus of claim 1 in which said sheet is replaceable.

* * * * *

UNITED STATES PATENT AND TRADEMARK OFFICE
CERTIFICATE OF CORRECTION

PATENT NO. : 6,205,955 B1　　　　　　　　　　　　　　　　　　　　Page 1 of 1
DATED : March 27, 2001
INVENTOR(S) : Michael T. Diep It is certified that error appears in the above-identified patent and that said Letters Patent is hereby corrected as shown below:

The inventor's name is shown as Michael Y. Diep. The correct name is Michael T. Diep. The middle initial is T., not Y.

The inventor's address is shown as:

1075 Bellevue Way N.E.
    Bellevue, WA 98004

The correct address is:

1075 Bellevue Way N.E., #433
    Bellevue, WA 98004

Signed and Sealed this

Sixteenth Day of October, 2001

*Attest:*

*Nicholas P. Godici*

*Attesting Officer*　　　　　　　NICHOLAS P. GODICI
　　　　　　　　　　　　*Acting Director of the United States Patent and Trademark Office*